United States Patent [19]

Kamiyama et al.

[11] Patent Number: 5,700,110
[45] Date of Patent: Dec. 23, 1997

[54] METHOD FOR LINING A BENT PIPE

[75] Inventors: Takao Kamiyama, Hiratsuka; Yasuhiro Yokoshima, Ibaraki-ken, both of Japan

[73] Assignees: Shonan Gosei-Jushi Seisakusho K.K., Kanagawa-ken; Yokoshima & Company, Ibaraki-ken, both of Japan

[21] Appl. No.: 589,688

[22] Filed: Jan. 22, 1996

[30] Foreign Application Priority Data

Jul. 7, 1995 [JP] Japan ................................ 7-171916

[51] Int. Cl.⁶ ........................................... F16L 55/16
[52] U.S. Cl. ........................ 405/154; 138/97; 156/287
[58] Field of Search ................ 405/154; 156/287; 138/97

[56] References Cited

U.S. PATENT DOCUMENTS

| | | | |
|---|---|---|---|
| 3,494,813 | 2/1970 | Lawrence et al. | 156/287 |
| 4,368,091 | 1/1983 | Ontsuga et al. | 156/287 |
| 4,680,066 | 7/1987 | Wood | 156/287 X |
| 4,770,562 | 9/1988 | Muller et al. | 405/154 |
| 4,778,553 | 10/1988 | Wood | 156/287 |
| 5,108,533 | 4/1992 | Long, Jr. et al. | 156/287 X |
| 5,200,011 | 4/1993 | Imamura et al. | 156/287 X |
| 5,329,063 | 7/1994 | Endoh | 156/287 X |
| 5,356,502 | 10/1994 | Kamiyama et al. | 156/287 X |
| 5,439,033 | 8/1995 | Kamiyama et al. | 156/287 X |
| 5,454,401 | 10/1995 | Kamiyama et al. | 156/287 X |
| 5,490,964 | 2/1996 | Kamiyama et al. | 156/287 X |
| 5,520,484 | 5/1996 | Kamiyama et al. | 405/154 |

FOREIGN PATENT DOCUMENTS 60-242038  12/1985  Japan.

OTHER PUBLICATIONS

BriskHeat Corporation "Full Coverage Insulated Drum Heaters" 1991, pp. 1–4.
MKS Instruments, Inc., "Heated Pumping Lines", Apr. 1994, p. 1.

*Primary Examiner*—Tamara L. Graysay
*Assistant Examiner*—Frederick L. Lagman
*Attorney, Agent, or Firm*—Lowe, Price, LeBlanc & Becker

[57] ABSTRACT

A bent pipe lining method which can get rid of bulky creases of the liner commonly formed at the bends of the pipe, and the method is characterized by a use of a flat belt that is hitched to the sewn-end of the liner bag, which pulls the flat belt inside itself as it is everted into the bent pipe; when the liner bag is hardened the flat belt is kept stretched so as to keep the bulky creases compressed and bent flatly.

10 Claims, 7 Drawing Sheets

METHOD FOR LINING A BENT PIPE

BACKGROUND OF THE INVENTION (Field of the Invention)

The present invention relates to a method for lining a bent pipe by applying a lining material on the inner wall of the bent pipe.

(Description of the Prior Art)

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened. Then, the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the everted tubular liner is pressed against the inner wall of the pipe by the said pressurized fluid or by an inflatable pressure bag, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method in principle is applicable to a pipe which is not straight, as is often the case with a branch pipe branching out from a main pipe, as well, and FIG. 7 illustrates an example wherein the same method is applied to a bent branch pipe 121 branching out from a main pipe 120.

(The Problems the Invention seeks to solve)

However, when a branch pipe has bends, such as the one shown in FIG. 7, which has three bends a, b and c, the everted liner 101 tends to be puckered at the bends, as schematically shown in FIG. 7. These puckers are unwelcome for they prevent the smooth flow of the fluid such as drainage in the pipe, and when a pucker is widespread, it tends to clog the pipe 121 eventually.

Thus, it is an object of the invention to provide an improved pipe lining method whereby it is possible to line a bent pipe without wrinkling the liner at the bends.

(Means to solve the Problems)

In order to solve the above problem and others, there is proposed a method for lining a bent pipe. According to the proposal, the invention includes the following steps: (a) a flat belt is fixed at the closed end of a conventional tubular liner bag before eversion, (b) then, the tubular liner bag is everted into the bent pipe, while pulling the flat belt inside itself; (c) next, the flat belt is stretched; (d) the everted tubular liner bag is inflated to press against the inner wall of the bent pipe as the pressure inside the everted tubular liner bag is increased; and (e) the hardenable liquid resin impregnated in the tubular liner bag is cured while keeping the tubular liner bag pressed against the inner wall of the bent pipe and keeping the flat belt stretched.

In one mode of the invention, at the above step (a) the other end of the flat belt is fixed outside that end of the bent pipe from which the tubular liner bag is everted into the bent pipe; and at the step (c) before stretching the flat belt, the closed end of the tubular liner bag is opened and the flat belt is freed from the tubular liner bag.

In a more preferred embodiment of the invention, at the step (c) the untied end of the flat belt is connected to a closed end of a tubular flexible bag whose open end is everted outwardly and connected to one end of a tubular ground nozzle in which the uneverted portion of the tubular flexible bag is contained, and the latterly opened end of the tubular liner bag is connected to the other end of the tubular ground nozzle, the tubular flexible bag being arranged such that when pressure in the tubular ground nozzle increases, it is everted to shoot therefrom, whereby the stretching of the flat belt is effected.

(Effects of the Invention)

According to the invention, the puckers of the branch pipe liner bag formed at the bends of the bent pipe are hardened while dog-eared by the stretched flat belt, so that the finished liner will have scarce puckers throughout the branch pipe. Consequently, the drain will flow smoothly through the bent branch pipe, and the problems attributable to the puckers such as clogging are solved.

The above and other objects and features of the invention will appear more fully hereinafter in the following description given in connection with the accompanying drawings and the novelty thereof pointed out in the appended claims.

(Embodiments)

Next, an embodiment of the invention will be described with reference to the attached drawings.

Figure 1:
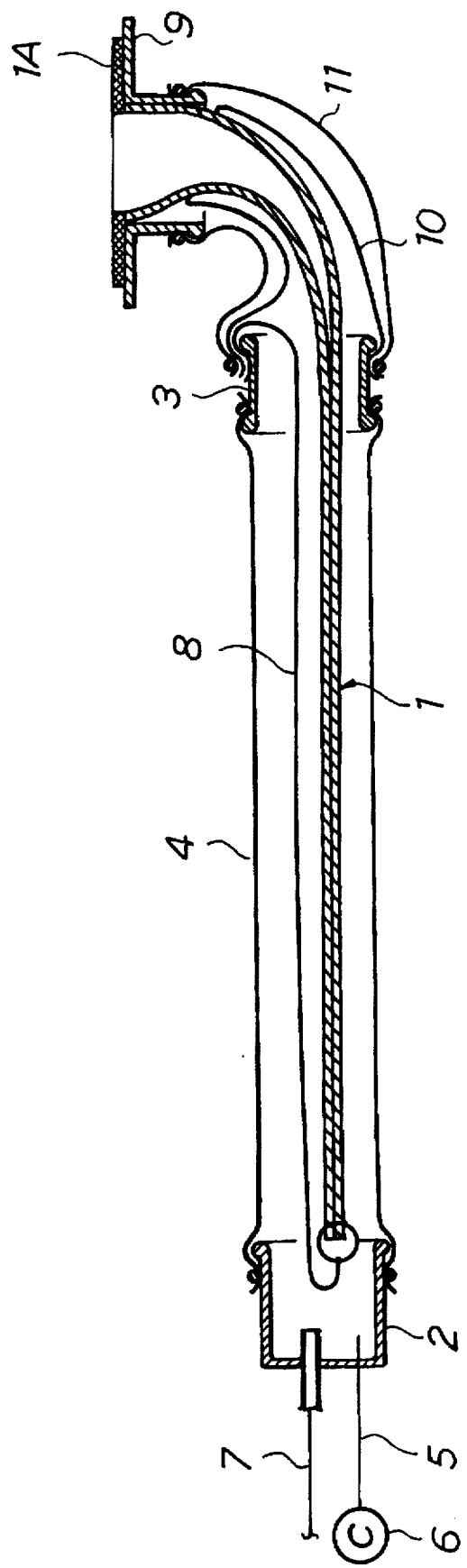
FIG. 1 is a sectional view showing a branch pipe liner bag before eversion, which is used in the underground pipe lining method according to the invention.

FIG. 1 is a sectional view showing a branch pipe liner bag 1 before eversion, which is used in the underground pipe lining method according to the invention. We will first explain how the branch pipe liner bag 1 itself is prepared.

Figure 2:
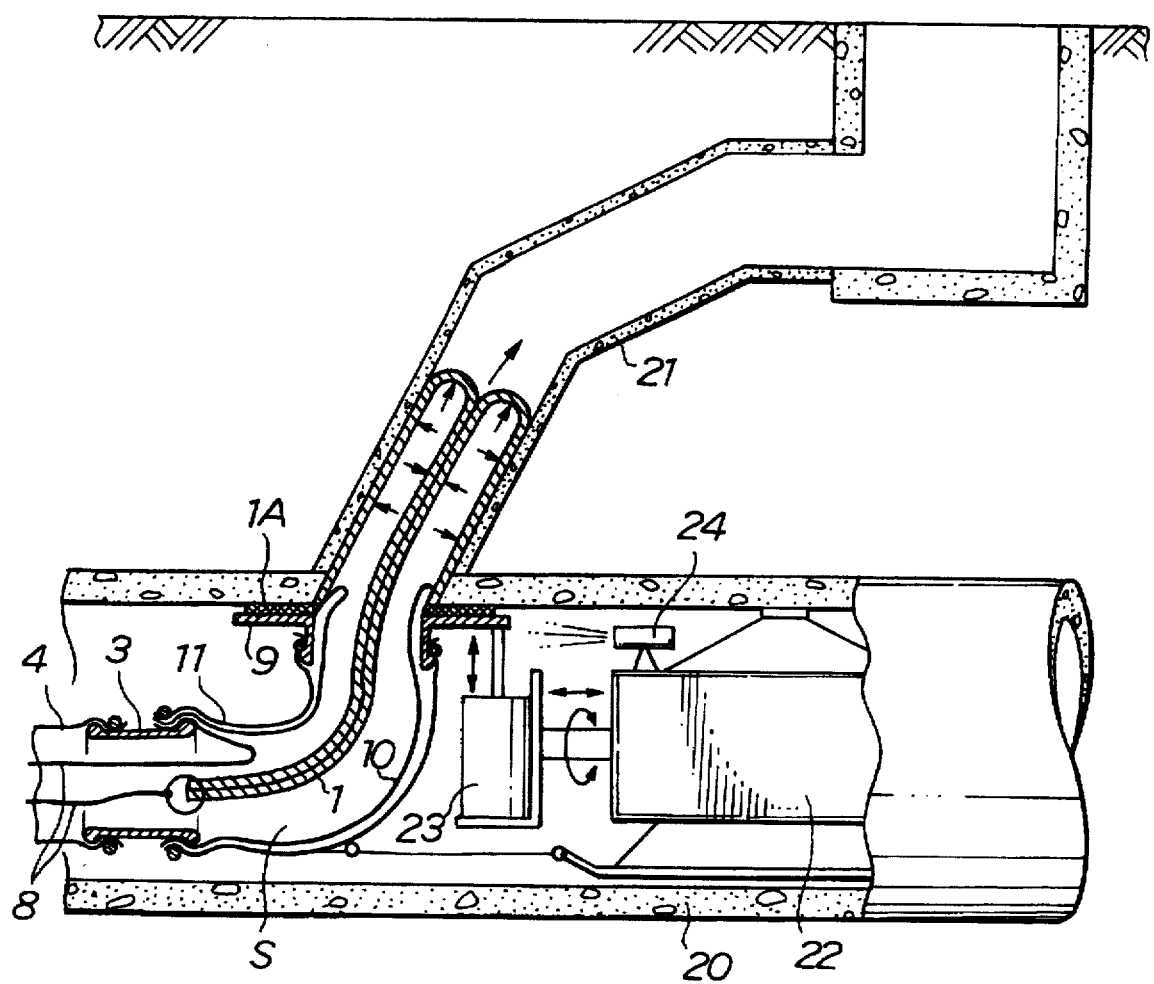
FIG. 2 is a sectional view illustrating a step of the underground pipe lining method according to the invention.

A rectangular felt sheet of nonwoven resin-absorbent fabric is sewed into a tubular shape. The tubular felt sheet is then externally sealed with an air- and water-tight plastic film and is soaked with a liquid thermosetting resin. One end of the tubular felt sheet is closed by sewing, and some length of the other end thereof is turned outwardly and cured to form a rigid collar 1A, as shown. More particularly, the rigid collar 1A is formed in an arcuate shape with a curvature equal to that of the inner wall of a main pipe 20 (FIG. 2).

Incidentally, the material of the nonwoven fabric of which the branch pipe liner bag 1 is made may be polyester, polypropylene, nylon, acrylic resin, or vinylon. The thermosetting resin to be impregnated through the liner 1 may be unsaturated polyester resin, epoxy resin or the like. The plastic film with which the external surface of the tubular liner is covered and sealed may be made of polyurethane, polyethylene, polyethylene/nylon co-polymer, or polyvinyl chloride.

Now, in FIG. 1, the reference numeral 2 designates a cup-like pressure bag rear end nozzle, and 3 a tubular pressure bag fixer nozzle, and a flexible tubular pressure bag 4 is connected between these nozzles. The rear end of the pressure bag 4 is closed by the nozzle 2. The pressure bag 4 is connected to a compressor 6 through an air hose 5 coupled to the pressure nozzle 2. A drain hose 7 is also coupled to the pressure nozzle 2.

Prior to the eversion, a flat belt 8 is tethered to the sewn-end of the branch pipe liner bag 1, and the liner bag 1 together with the flat belt 8 is inserted into the pressure bag 4 with the sewn-end at the lead; then, the collar 1A, which comes outside the pressure bag 4 is attached to the outer wall of a cylindrical portion of a set nozzle 9, as shown in FIG. 1. One end of a peel-back tube 10 is attached to the outer wall of the tubular pressure bag fixer nozzle 3, and the other end of the same is temporarily adhered to the outer wall of the branch pipe liner bag 1 at a location in the vicinity of the collar 1A such that the peel-back tube 10 may be easily detached therefrom after the repair operation is completed. A guide tube 11, which is arranged such that it contains the peel-back tube 10, has its one end attached to the outer wall of the tubular pressure bag fixer nozzle 3 and the other end to the outer wall of the cylindrical portion of the set nozzle 9. Also, the flat belt 8, whose one end is connected to the sewn-end of the branch pipe liner bag 1, has the other end joined with ends of the peel-back tube 10 and the guide tube 11 to be fixed on the outer wall of the is fixed on the outer wall of the tubular pressure bag fixer nozzle 3. Incidentally, the flat belt 8 is made of a woven or nonwoven cloth or either of these impregnated with a plastic resin.

Next, with reference to FIGS. 2 through 6, we will explain the method for lining a branch pipe by applying the branch pipe liner bag 1 of the above-described construction to the inner wall of the pipe. Incidentally, FIGS. 2 through 6 are sectional views consecutively illustrating the steps of the underground pipe lining method according to the invention.

In FIG. 2, the reference numeral 20 designates an underground sewer main pipe, and the reference numeral 21 designates a branch pipe which is narrower than and branched off the main pipe 20. As can be seen, there have already been installed inside the main pipe 20 an on-the-sleigh robot 22, the pressure bag 4 with a branch pipe liner bag 1 already shot out therefrom, and other elements which had previously been assembled and integrated on the ground.

The on-the-sleigh robot 22 is equipped with a hydraulically-operated piston cylinder 23, which is driven to reciprocate its piston rod to push the set nozzle 9 up and down, the nozzle 9 being connected to the piston rod. The piston cylinder 23 is also adapted to turn round together with the spin shaft by which it is connected to the main body of the robot 22. A TV camera 24 for monitoring is mounted on top of the main body of the robot 22.

The on-the-sleigh robot 22 is tied with a rope which is tethered to the guide tube 11, so that the robot 22, the branch pipe liner bag 1 supported thereby, the pressure bag 4, etc. are transported in one body. Thus, while monitoring the positions of the elements in the main pipe 20 by means of the TV camera 24, the collar 1A of the branch pipe liner bag 1 is brought to the position right below the opening by which the branch pipe 21 opens into the main pipe 20.

Then, the piston cylinder 23 of the robot 22 is driven to push its piston rod upward to cause the set nozzle 9 to press the collar 1A of the branch pipe liner bag 1 against the inner wall of the main pipe 20 around the perimeter of the branch pipe opening such that the collar 1A is closely contacted with the inner wall of the main pipe 20, as illustrated.

Incidentally, as of the moment, a closed space S is formed defined by the pressure bag 4, the pressure nozzle 2, the branch pipe liner bag 1 and the peel-back tube 10. The compressor 6 (ref. FIG. 1) is driven to supply compressed air to the space S within the pressure bag 4 by way of the air hose 5; then, as shown in FIG. 2, the branch pipe liner bag 1 is inflated and everted by the compressed air to proceed in the branch pipe 21 from the main pipe 20 toward the ground surface (upward). On this occasion, since sealing effect is secured at the joint between the branch pipe liner bag 1 and the peel-back tube 10, leakage of the compressed air through the joint is prevented and the closed space S is airtightly maintained, so that the insertion of the branch pipe liner bag 1 into the branch pipe 21 by eversion is conducted smoothly.

Figure 3:
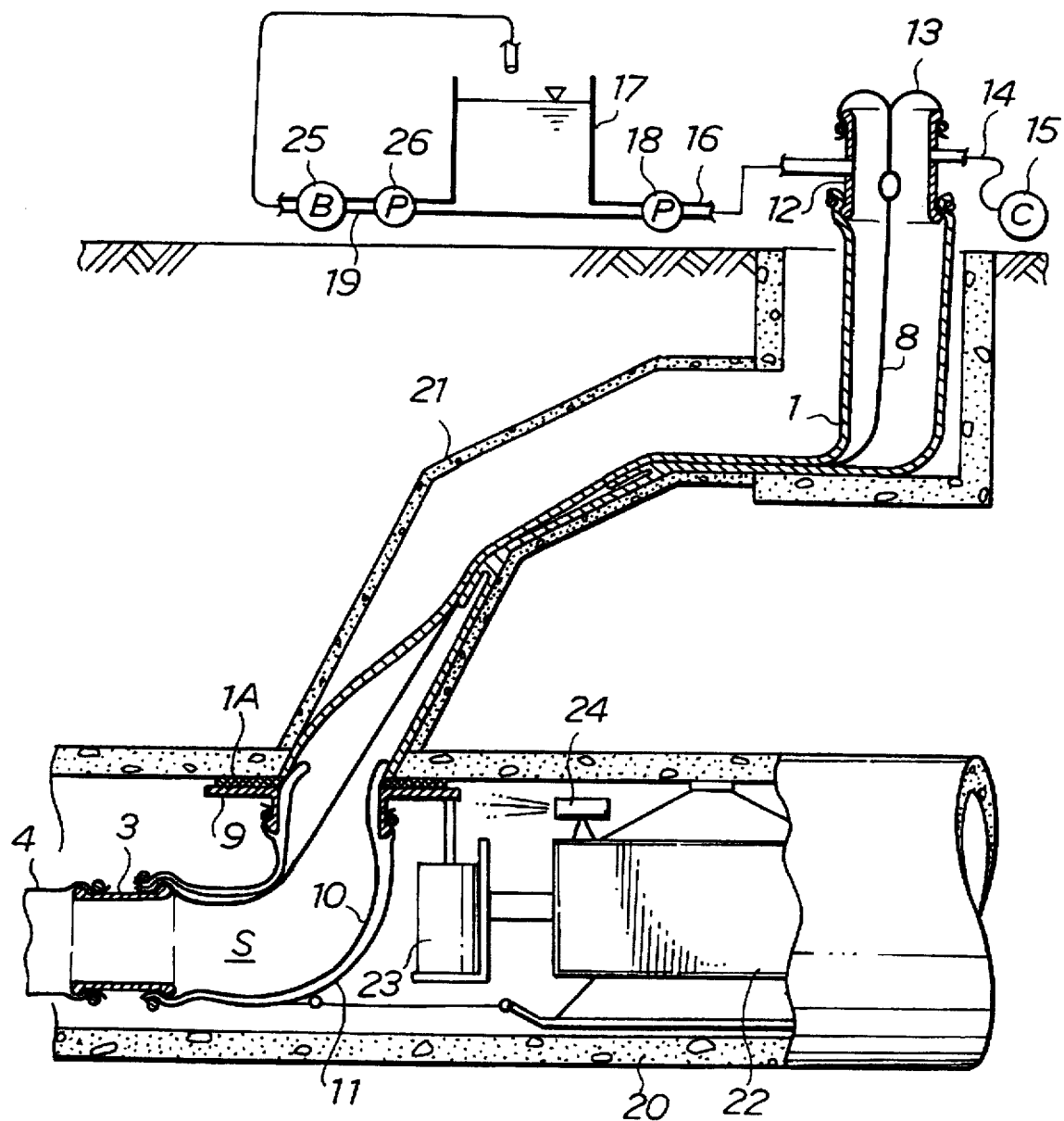
FIG. 3 is a sectional view illustrating another step of the underground pipe lining method according to the invention.

Thus, as the entire length of the branch pipe liner bag 1 is inserted by eversion into the branch pipe 21, the flat belt 8, which is tethered to the sewn-end of the branch pipe liner bag 1, is drawn into the branch pipe liner bag 1, as shown in FIG. 3. Thereafter, the air inside the closed space S is drawn out and the sewn-end of the branch pipe liner bag 1 is unsewn to open and freed from the flat belt 8, and then attached to the lower portion of the outer wall of a vertical ground nozzle 12 installed above the ground. It is also seen that the branch pipe liner bag 1 is puckered at the bends of the branch pipe 21.

As shown in FIG. 3, a flexible eversion tube 13 is contained in the ground nozzle 12 in a manner such that the upper end of the tube 13 is everted outwardly and attached to the upper portion of the outer wall of the ground nozzle 12. The lower end of the eversion tube 13 is closed and to this end is tied the end of the flat belt 8 which used to be tethered to the sewn-end of the branch pipe liner bag 1. Thus, the space S is now defined by the pressure bag 4, the pressure nozzle 2, the branch pipe liner bag 1, the peel-back tube 10, the ground nozzle 12 and the eversion tube 13. As shown in FIG. 3, a compressor 15 is connected to the ground nozzle 12 through an air hose 14, and also a hot water tank 17 installed on the ground is connected to the ground nozzle 12 through a hot water hose 16, as shown. Furthermore, a hot water pump 18 is provided across the hot water hose 16, and another hot water hose 19 is provided to lead out from a lower part of the hot water tank 17 and is disposed to open over the interior of the hot water tank 17. Across this hose 19 are provided a boiler 25 and a hot water pump 26.

Figure 4:
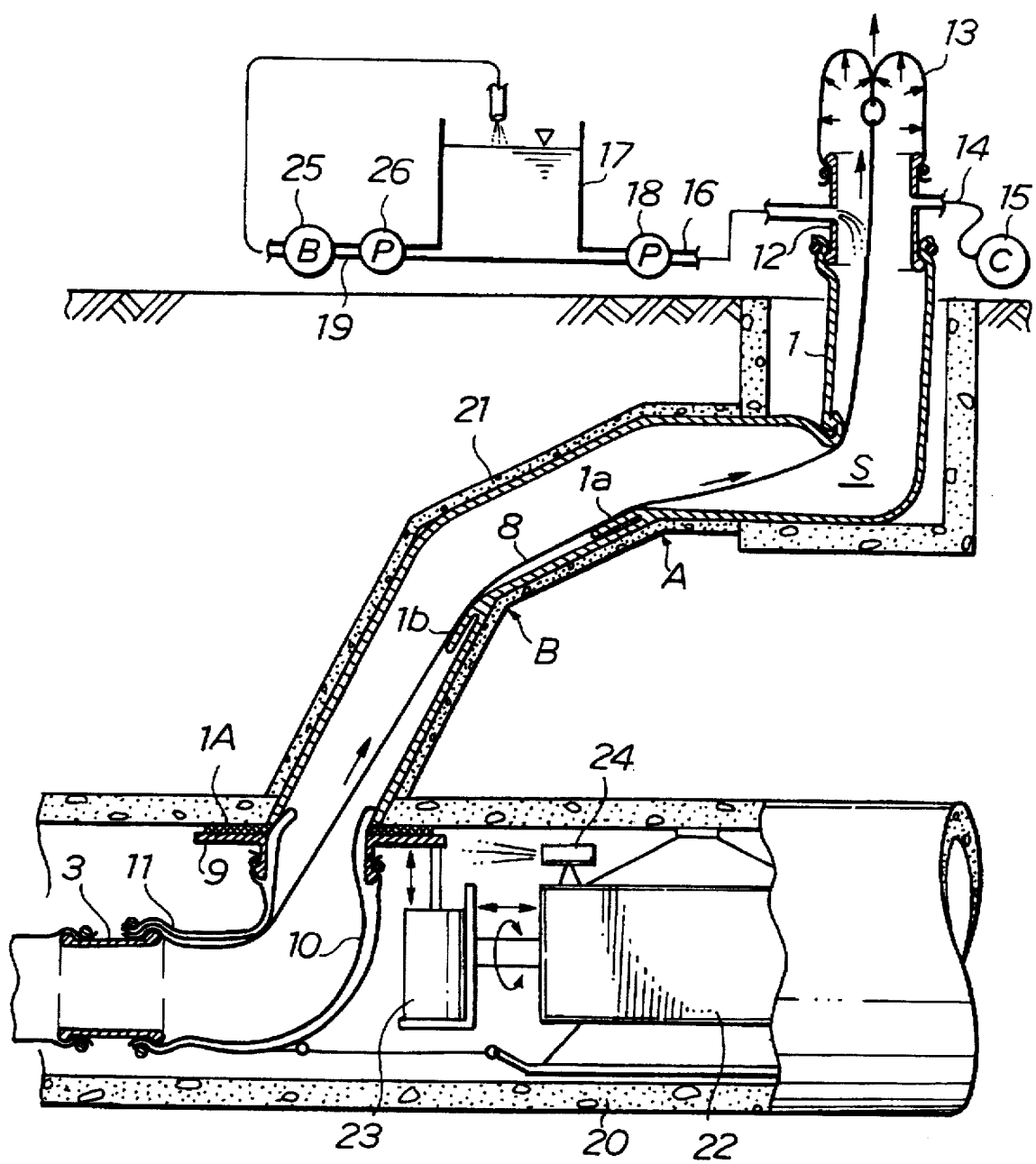
FIG. 4 is a sectional view illustrating still another step of the underground pipe lining method according to the invention.

Now, when the compressor 15 is driven to supply compressed air to the closed space S via the air hose 14, the branch pipe liner bag 1 is inflated and the flexible eversion tube 13 is everted fully to shoot out from the ground nozzle 12 while pulling up the flat belt 8, as shown in FIG. 4. As the result, the flat belt 8 is kept stretched within the tubular branch pipe liner 1. Thus, the stretched flat belt 8 presses puckers 1a, 1b formed at the bends A, B of the branch pipe 21, and prevents the puckers 1a, 1b from erecting and wide-spreading and clogging the branch pipe 21. Incidentally, on this occasion, the inflated branch pipe liner bag 1 is pressed against the inner wall of the branch pipe 21 by means of the compressed air inside the space S, as shown in FIG. 4. In the cases where the angles of the bends of the branch pipe 21 are such that the stretched flat belt 8 does not touch or press the puckers with sufficient strength, it is necessary to depress the everted branch pipe liner bag 1 in an access hole, which is the vertical hole made between the branch pipe 21 and the surface of the ground, as shown in FIG. 4.

When everything is set in a manner as shown in FIG. 4, the hot water pumps 18, 26 and the boiler 25 are operated to supply the branch pipe liner bag 1 with the hot water from the hot water tank 17 via the hot water pipe 16, and, as the result, the branch pipe liner 1 is heated by the hot water so that the thermosetting resin impregnated through the thickness of the branch pipe liner 1 is cured to harden. So, the branch pipe liner 1 becomes rigid while it is closely pressed on the inner wall of the branch pipe 21, and thus the branch pipe 21 is internally lined closely with the rigid branch pipe liner 1, and rehabilitated. Now, the puckers 1a, 1b of the branch pipe liner bag 1 formed at the bends A, B of the branch pipe 21 are hardened while flatly bent against the unpuckered parts of the branch pipe liner 1 by the stretched flat belt 8, as described above, so that the finished liner 1 will have scarce puckers throughout the branch pipe 21. Consequently, it is thereby possible to line the bent branch pipe 21 without substantially wrinkling the liner 1 at the bends, and the drain will flow smoothly through the branch pipe 21 (liner 1), and the branch pipe 21 will not be clogged.

Incidentally, before the hot water pump 18 is started to supply hot water to the branch pipe liner bag 1, the water in the tank 17 has been already heated by means of the boiler 25. More particularly, the water in the hot water tank 17 is sent to the boiler 25 by the hot water pump 26 and is heated to a predetermined temperature by the boiler 25 and then returned to the hot water tank 17.

Figure 5:
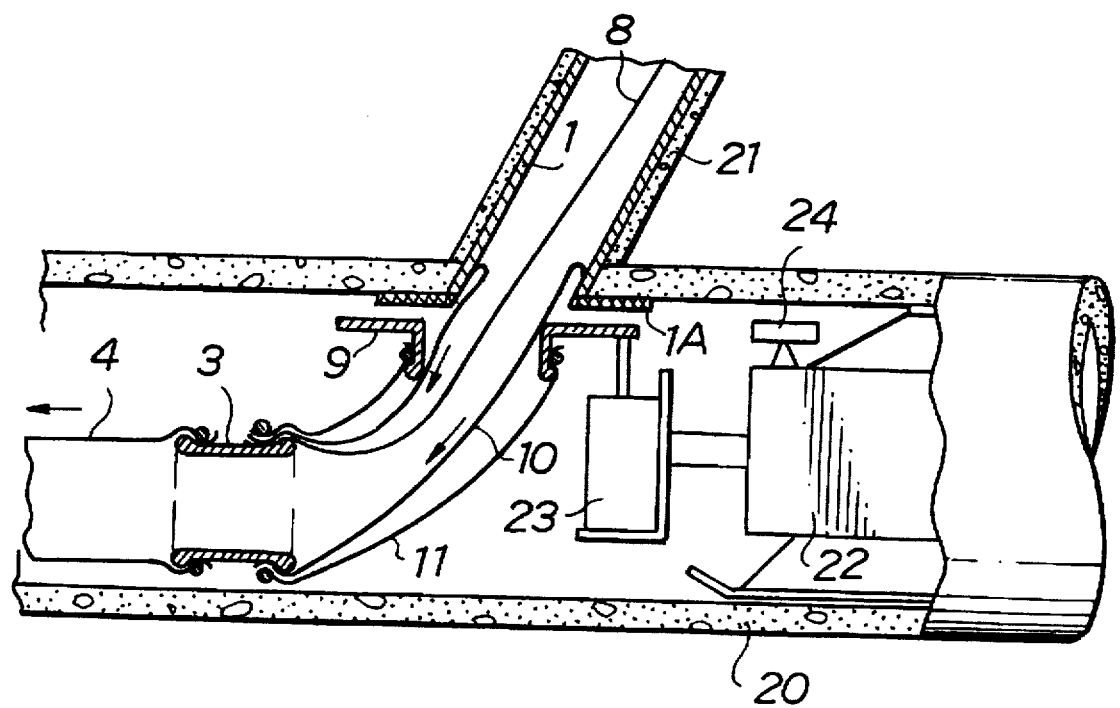
FIG. 5 is a sectional view illustrating yet another step of the underground pipe lining method according to the invention.
Figure 6:
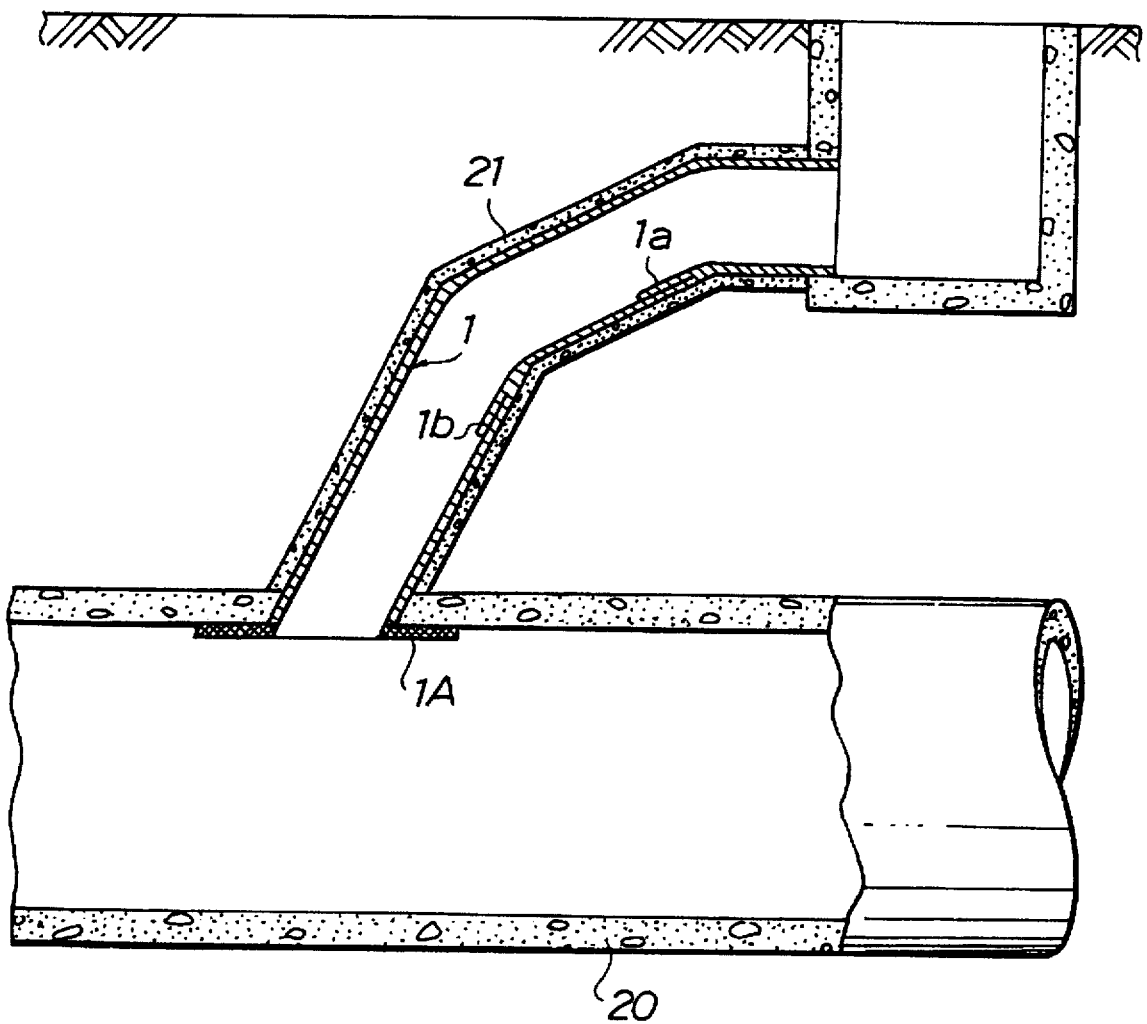
FIG. 6 is a sectional view illustrating another step of the underground pipe lining method according to the invention.
Figure 7:
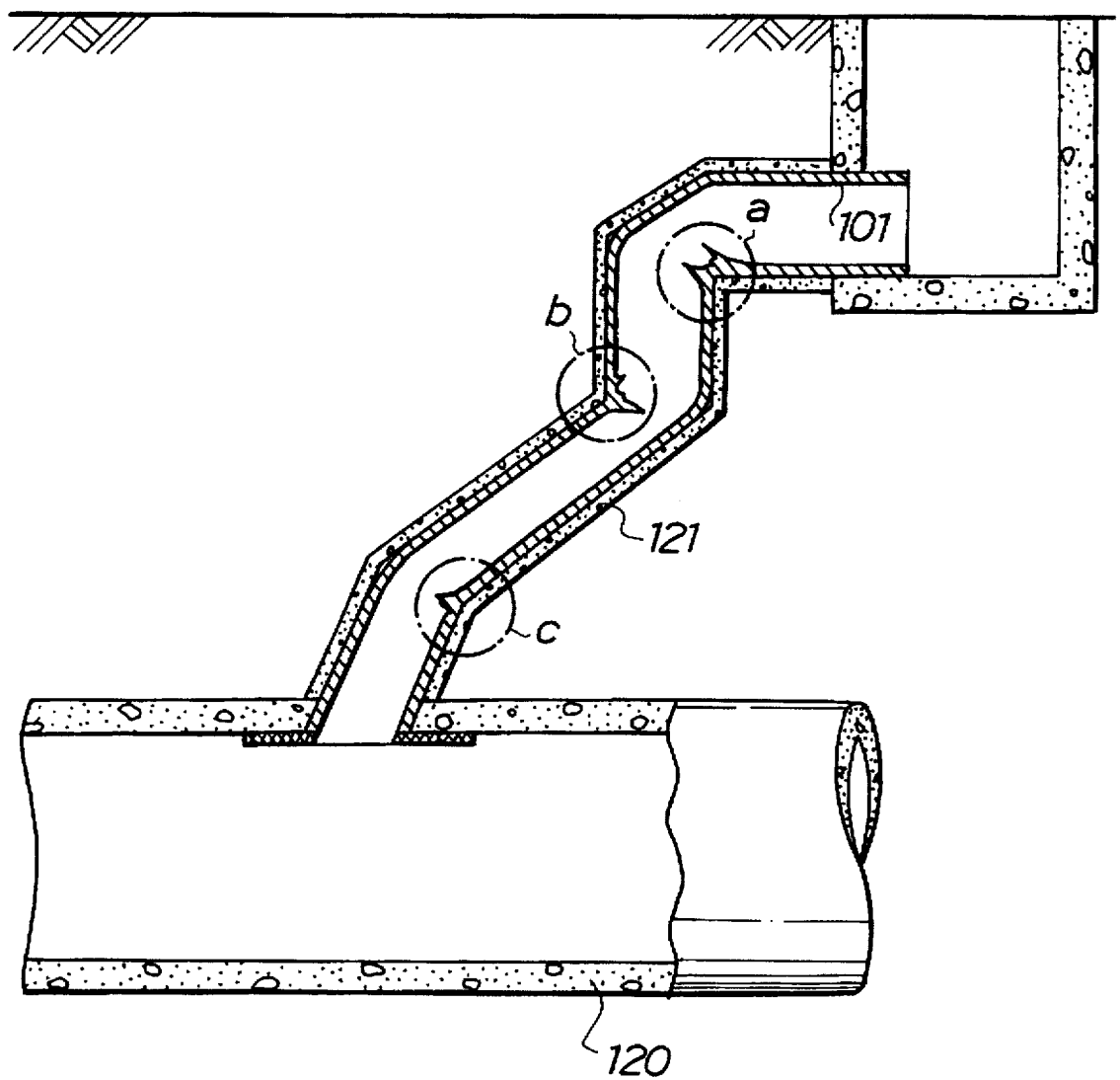
FIG. 7 is a sectional side view of a site containing a bent branch pipe, illustrating a conventional underground pipe lining method.

When the curing operation is completed and the branch pipe 21 is lined with the branch pipe liner 1, the hot water is removed from the space S by way of the drain hose 7, and the compressed air is released by detaching the flexible eversion tube 13. Thereafter, as shown in FIG. 5, the piston cylinder 23 of the on-the-sleigh robot 22 is driven to pull back its piston rod to cause the set nozzle 9 to be detached from the collar 1A of the branch pipe liner bag 1. Then, the drain hose 7 is drawn leftward, as seen in FIG. 1, whereby the on-the-sleigh robot 22, the pressure bag 4, the peel-back tube 10, etc. are moved leftward in one body, and on this occasion, the peel-back tube 10 is peeled off the branch pipe liner 1 easily, so that eventually the on-the-sleigh robot 22, the pressure bag 4, the peel-back tube 10, etc. are retrieved from the main pipe 20 at once. Also, the ground nozzle 12 is removed. Now, as shown in FIG. 6, only the rigid branch pipe liner 1 is left inside the branch pipe 21, and when the unnecessary portions of the rigid branch pipe liner 1 are cut off and removed from the access hole. Thus, a series of the lining operation on the branch pipe 21 is completed.

Incidentally, in this embodiment, the flat belt 8 is stretched inside the tubular liner 1 by means of the flexible eversion tube 13, it is also possible to stretch a flat belt by means of a winder. The flat belt may be made of any tough material that withstands the hot water and friction against the rigid liner material.

Furthermore, in the above example the method of the invention is applied to a bent branch pipe, it is also possible to apply the method to a main pipe or other kinds of pipes with bends.

As can be clearly understood from the foregoing description, according to the present invention, in a method for lining a bent pipe effected by everting a tubular liner bag impregnated with a hardenable liquid resin by means of a fluid pressure, and then hardening the liquid resin impregnated in the tubular liner bag while keeping the tubular liner bag pressed against the inner wall of the bent pipe, a flat belt is provided to extend through the inside of the tubular liner bag, and when the tubular liner bag is hardened while it is kept pressed against the inner wall of the bent pipe, the flat belt is kept stretched so as to dog-ear any puckers formed at the bends of the pipe, so that it is now possible to get rid of any puckers at the bends of the pipe that are erected.

While the invention has been described in its preferred embodiment, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A method for lining a bent pipe with a tubular liner bag made of a nonwoven fabric impregnated with a hardenable liquid resin, one end of said tubular liner bag being closed, comprising the steps of:

(a) fixing one end of a flat belt at said closed end of the tubular liner bag;

(b) everting said tubular liner bag into the bent pipe;

(c) stretching said flat belt;

(d) inflating the everted tubular liner bar to press against the inner wall of the bent pipe by increasing the pressure inside the everted tubular liner bag; and (e) hardening said hardenable liquid resin impregnated in the tubular liner bag while keeping the tubular liner bag pressed against the inner wall of the bent pipe and keeping said flat belt stretched;

wherein at said step (a) fixing the other end of said flat belt outside that end of the bent pipe from which the tubular liner bag is everted into the bent pipe; and at said step (c) before stretching the flat belt, opening said closed end of the tubular liner bag and untying the flat belt from said tubular liner bag, and retying the untied end of the flat belt to an eversion tube configured to close the opened end of the tubular liner bag.

2. A method as recited in claim 1 wherein at said step (c) connecting said untied end of the flat belt to a closed end of a tubular flexible bag whose open end is everted outwardly and connected to one end of a tubular ground nozzle in which the uneverted portion of the tubular flexible bag is contained, and said latterly opened end of the tubular liner bag is connected to the other end of said tubular ground nozzle, said tubular flexible bag being arranged such that when pressure in the tubular ground nozzle increases, it is everted to shoot therefrom.

3. A method of lining a pipe, comprising the steps of:
    installing a hardenable tubular liner within a bent pipe;
    hardening the installed tubular liner; and
    stretching a flexible belt so as to press a portion of the installed liner against a bent inner wall portion of the bent pipe during hardening.

4. A method of lining a pipe as recited in claim 3, wherein the step of hardening the installed tubular liner includes heat treating the installed tubular liner.

5. A method of lining a pipe as recited in claim 3, wherein the step of hardening the installed tubular liner includes thermosetting a resin impregnated in the installed tubular liner by filling the installed tubular liner with a hot fluid.

6. A method of lining a pipe as recited in claim 3, further comprising the step of installing the flexible belt simultaneously with the installation of the hardenable tubular liner.

7. A method of lining a pipe as recited in claim 3, wherein the step of installing the hardenable tubular liner includes everting the hardenable tubular liner, with the flexible belt removably connected thereto, into the bent pipe.

8. A method of lining a pipe as recited in claim 3, further comprising the steps of:
    fixing one end of the flexible belt outside of and proximate to one end of the bent pipe;
    connecting the other end of the flexible belt to a stretching means; and
    applying a force to the stretching means to stretch the flexible belt.

9. A method of lining a pipe as recited in claim 8, wherein the applying of the force includes developing an air pressure on an inner surface of the stretching means.

10. A method of lining a pipe as recited in claim 8, wherein the applying of the force includes inflating the installed tubular liner.

* * * * *